United States Patent [19]
Daouse et al.

[11] Patent Number: 5,843,512
[45] Date of Patent: *Dec. 1, 1998

[54] PREPARATION OF CHOCOLATE-COATED FROZEN CONFECTIONARY ARTICLES

[75] Inventors: Alain Daouse, Noailles; Christian Mange, Beauvais, both of France

[73] Assignee: Nestec S.A., Vevey, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 620,107

[22] Filed: Mar. 21, 1996

[30] Foreign Application Priority Data

Mar. 22, 1995 [EP] European Pat. Off. .............. 95104198

[51] Int. Cl.$^6$ ...................................................... A23G 3/12
[52] U.S. Cl. ............................ 426/512; 426/95; 426/101; 426/138; 426/139; 426/143; 426/279; 426/280; 426/282; 426/514; 426/515; 426/660
[58] Field of Search .............................. 426/95, 101, 138, 426/139, 143, 279, 280, 282, 512, 514, 515, 660

[56] References Cited

U.S. PATENT DOCUMENTS

| | | |
|---|---|---|
| 3,529,553 | 9/1970 | Rutter .......................................... 107/4 |
| 3,770,460 | 11/1973 | Vroman . | |
| 5,359,858 | 11/1994 | Miller et al. . | |
| 5,374,436 | 12/1994 | White et al. ............................. 426/279 |

FOREIGN PATENT DOCUMENTS

| | | | |
|---|---|---|---|
| 2263615 | 8/1993 | United Kingdom ................... 426/101 |
| 94/07375 | 4/1994 | WIPO . |
| WO9407375 | 4/1994 | WIPO . |

OTHER PUBLICATIONS

Green, Donald, Perry's Chemical Engineers' Handbook, 6th Ed., pp. 5–24, 1984.

*Primary Examiner*—Stanley S. Silverman
*Assistant Examiner*—Michael P. Colaianni
*Attorney, Agent, or Firm*—Vort & O'Donnell,LLP

[57] ABSTRACT

A confectionery article is prepared which has a shell of chocolate wherein chocolate having a temperature greater than 35° C. is poured into an aluminum alloy lost-wax-cast-mold having a temperature of not above −10° C. to form a shell, and a remainder portion of the chocolate which is sufficiently liquid for being sucked from the shell is vacuum-suctioned from the shell to obtain a shell having a hollowed space. The process is carried out in an atmosphere having a relative humidity of less than 60%, and the process further includes depositing a frozen confection into the shell hollow space, and also, a biscuit, particularly one coated by a fatty composition, may be deposited within the shell with the frozen confection and also subsequently enrobed to provide a base integral with the shell.

16 Claims, 4 Drawing Sheets

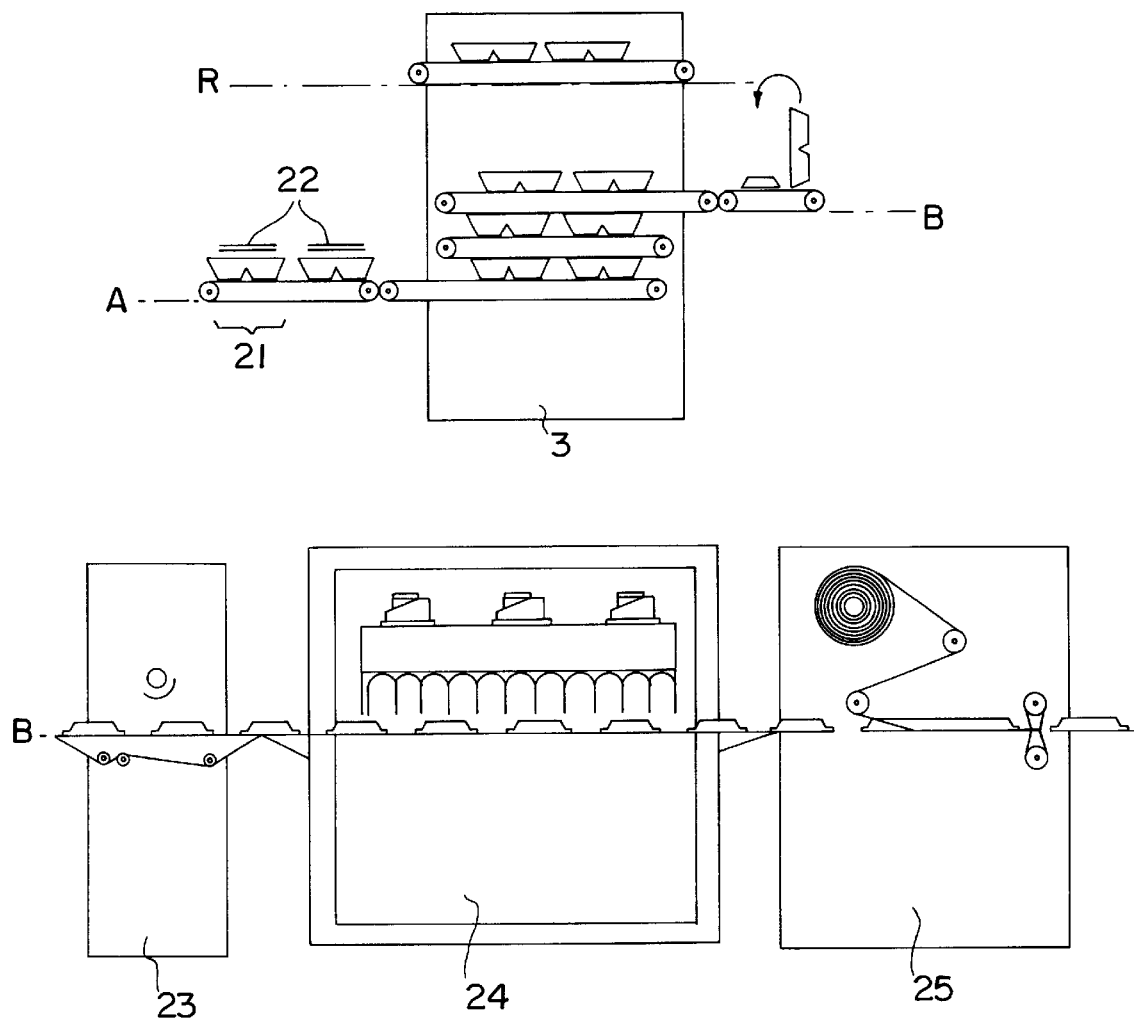
FIG. IA

PREPARATION OF CHOCOLATE-COATED FROZEN CONFECTIONARY ARTICLES

BACKGROUND OF THE INVENTION

The present invention relates to preparation of confectionery articles and in particular, to preparation of confectionery articles comprising a chocolate shell and to frozen articles wherein the shell contains a frozen confection, including ice cream.

There is known, for example from U.S. Pat. No. 3,529, 553, a method of moulding hollow chocolate shells in which melted chocolate is poured into cavities pressed in an aluninium foil serving as a mould cooled to low temperature, the chocolate is left to solidify in contact with the cooled surface of the mould, and then the still-liquid centre of the chocolate is extracted by means of tubular nozzles connected to a reservoir under vacuum, so as to form a hollow chocolate shell with a thin wall. The extracted chocolate is recirculated into the reservoir of the apportioning machine by means of a pump and a tube heated to keep the chocolate mass in the liquefied state.

In the field of frozen confectionery articles, the principle of the cold mould is also used. for example in PCT International Patent Application Publication No. WO 91/13557, to manufacture frozen cones by moulding a layer of chocolate inside a wafer cone. To do this, a mass of liquid chocolate is poured inside a wafer cone, and then the mass is distributed in a thin layer on the internal surface of the cone by inserting a cold conical counter-mould into the wafer.

SUMMARY OF THE INVENTION

The object of the invention is to manufacture, at a high rate, moulded frozen confectionery articles comprising a hollow chocolate shell with a thin wall, the shell being sufficiently rigid so as not to crumble during its formation or to be damaged when being removed from the mould, and which can easily be removed from the mould.

To this end, the method according to the invention comprises the moulding of shells with thin walls of chocolate by apportioning liquid chocolate into pre-cooled moulds and then sucking out the still-liquid chocolate from the mould centre, and the invention further is characterised in that the shell is formed by pouring chocolate, at a temperature greater than 35° C., into the alveoli of rigid aluminium alloy moulds manufactured by lost-wax casting, cooled to a temperature less than or equal to −10° C., in an environment with a relative humidity of less than 60%, so that the chocolate completely fills the alveoli and solidifies on the surface in contact with the cold wall of the mould, and then the still-liquid centre is extracted by suction under vacuum.

The process of the present invention further includes preparation of a frozen confectionery article wherein a frozen confection, in particular ice cream, is deposited into the hollow space of the shell and includes depositing a biscuit onto the frozen confection, in particular wherein a fatty coating separates the biscuit from the frozen confection and includes enrobing the biscuit with a fatty composition, particularly chocolate, to provide a base so that the frozen confection and biscuit are enclosed by the shell and base.

The present invention also includes the products of the processes described above and provides frozen confectionery articles comprising a moulded shell of chocolate, or of a coating fat, and the invention includes articles comprising, inside the shell, a mass of frozen confection and also, optionally, comprising inside the shell, a biscuit and includes articles wherein the biscuit is protected against moisture by an enrobing layer.

DETAILED DESCRIPTION OF THE INVENTIONS

According to the process of the invention, the alveoli of the moulds are completely filled with liquid chocolate from controlled nozzles delivering, in successive doses, exactly the volumetric quantity representing the volume of an alveolus, into the alveoli of the moulds, preferably passing continuously on a conveyor. The chocolate is fed at a temperature higher than the tempering temperature, preferably around 50° C., at which the chocolate has the minimum flow threshold.

The moulds are manufactured in a foundry from aluminium alloy by the lost-wax casting method. They have sufficient thickness to ensure good rigidity, greater than 1 mm, preferably 1 to 3 mm, for example approximately 2.5 mm. The material and its thickness give excellent heat transfer between the mould cooling fluid and the product to be moulded and affords good removal from the mould.

The lost-wax casting method gives the surface a certain porosity, or surface roughness, without its having jutting cavities or splits. Preferably, the surface roughness is expressed by an RA value, representing the mean value of the peak height of the protrusions in microns. The conditions of the lost-wax casting process give the surface roughness dictated by the configuration of the surface of the wax and the first coating bath. The RA value is preferably 1.6 to 3.2 microns, for good removal from the mould.

This surface state appears to assist the contraction of the chocolate and thus facilitates removal from the mould.

In addition, the thermal characteristics, on the one hand, of the material of the mould, which is a good conductor, and on the other hand, of the chocolate, which is thermally inert, are very different, which enables the shell to be moulded under good conditions, since the surface rigidifies rapidly whereas the centre of the mass of chocolate remains sufficiently liquid to be able to be sucked out.

The ambient air has a relative humidity of less than 60% and preferably equal to or even less than 10%. It has been found that the higher the relative humidity, for example around 60%, the lower must be the temperature of the moulds at the time of removal from the mould, around −30° C. On the other hand, a relative humidity of around 10% and less requires only a mould temperature of around −10° C. in order to obtain the same mould removal characteristics. The lowest relative humidity possible is preferred, also because to a greater extent it prevents frosting of the surface of the moulds, which frosting would prevent removal from the moulds.

It has also been found that the temperature of the moulds should not be too low during the manufacture of the shell, so that the thermal shock inflicted on the chocolate would not be too abrupt, which would result in a risk of collapse of the thin walls of the shell. In practice it is preferred for the moulds to be at approximately −10° C. to −25° C.

Through these measures, a thickness of the chocolate of the shell of approximately 0.5 to 2 mm is obtained, together with good strength thereof, and the frozen confectionery product may have a shell thickness of from 0.5 to 3 mm.

In the context of the invention, the term "chocolate" is not limited to chocolate strictly speaking, but extends to the fatty compositions normally used in chocolate confectionery, comprising vegetable fats in substitution for cocoa butter, such as, for example, coverings or compounds. The chocolate in question advantageously contains less than 50% and preferably around 40% by weight of fat.

Preferably, in a frozen confectionery article of the invention comprising a biscuit, the biscuit is a wafer, for example consisting of a friable thin rolled sheet of biscuit. The wafer is protected from moisture by a coating of fatty compositions notably of chocolate or fat coating so that it can be in contact with the frozen composition without risk of drawing in its moisture and becoming soft.

In a preferred embodiment, the article is a moulded frozen bar in the form of an ingot with sharp angles. The shell of chocolate or of fat coating comprises an alveolus and a base closing the alveolus. The shell has a thickness of 0.5 to 3 mm and preferably 1.5 to 2.5 mm. The ice cream represents, in volume, around 50%, whereas the shell and the base represent, in volume, around 33%, the remainder consisting of enrobed biscuit. In a particular embodiment, the shell consists of an alveolus with a double compartnent and the enrobed biscuit is disposed longitudinally between the mass of frozen composition and the base, that is, practically over all the length and over all the width of the alveolus.

The invention also concerns apparatus for manufacturing frozen confectionery articles of the type described above, comprising:

- an endless chain for conveying mould plates having alveoli, and
- on top of the said chain, in succession,
    - a chocolate apportioning machine filling the alveoli to the brim with liquid chocolate,
    - a station for sucking out the still-liquid centres producing the chocolate shells with thin walls,
    - a station for filling the shells with frozen composition, and
    - required, a station for depositing a wafer, and
- passed through by the said chain, a cooling tunnel, in which there travel the filled moulds on the outward run and the emnpty moulds on is return run of the chain, and then
- a station for turning over the moulds and mould emptying,
- a coating station, and
- a station for wrapping the articles.

The invention also concerns a device for sucking out liquid chocolate poured into the alveoli of mould plates associated with an endless conveyor chain including:

- a guided carriage which can be given a horizontal reciprocating movement,
- a suction valve connected by a flexible tube to a chocolate reservoir itself connected to a vacuum,
- an elevator device supported by the carriage and carrying the valve,
- a connecting piece extending the valve, with a shape complementary to that of the alveoli of a mould plate and thermostatically controlled, and
- a guide for holding the mould plates in the position of being driven by the chain.

The suction device is driven step-by-step or, preferably, in step with the endless conveyor chain.

In this preferred form, the suction device descends whilst moving forward in the direction of travel of the chain by virtue of the combined action of the horizontal forward movement of the carriage and the downward movement of the elevator. The descent speed is adjustable. The suction takes place at the same time as the descent and preferably starts at the commencement of the descent. It continues during the major part of the period of the movement in step with the chain and stops just before the upward movement of the elevator. This upward movement takes place in step in order to release the tool from the mould. This facilitates the maintenance of the vacuum. There follows the return of the carriage to its initial position. The return speed is very rapid, for example approximately four times faster than the in-step speed.

The raising and lowering movement can be obtained by means of a ram, and the in-step movement can be obtained by servo motor or preferably by cams, for example by means of a roller fixed to the valve and running on a fixed cam.

It is advantageous for there to be little tolerance between the connecting piece of the suction device and the mould plate.

The device also includes a component for holding the mould plates in the position of being driven by the chain and therefore against the links of this chain during the suction phase. This can be by means of a double chain for holding the moulds in position with respect to the suction nozzle. As a variant, legs or rails can hold the mould plates against the conveyor chain.

The accompanying drawings illustrate diagrammatically and by way of example a particular embodiment of the apparatus and device according to the invention

BRIEF DESCRIPTION OF THE DRAWINGS

FIGS 1 and 1A are a diagrammatic view of the whole of the apparatus.

DETAILED DESCRIPTION OF THE DRAWINGS

Figure 1:
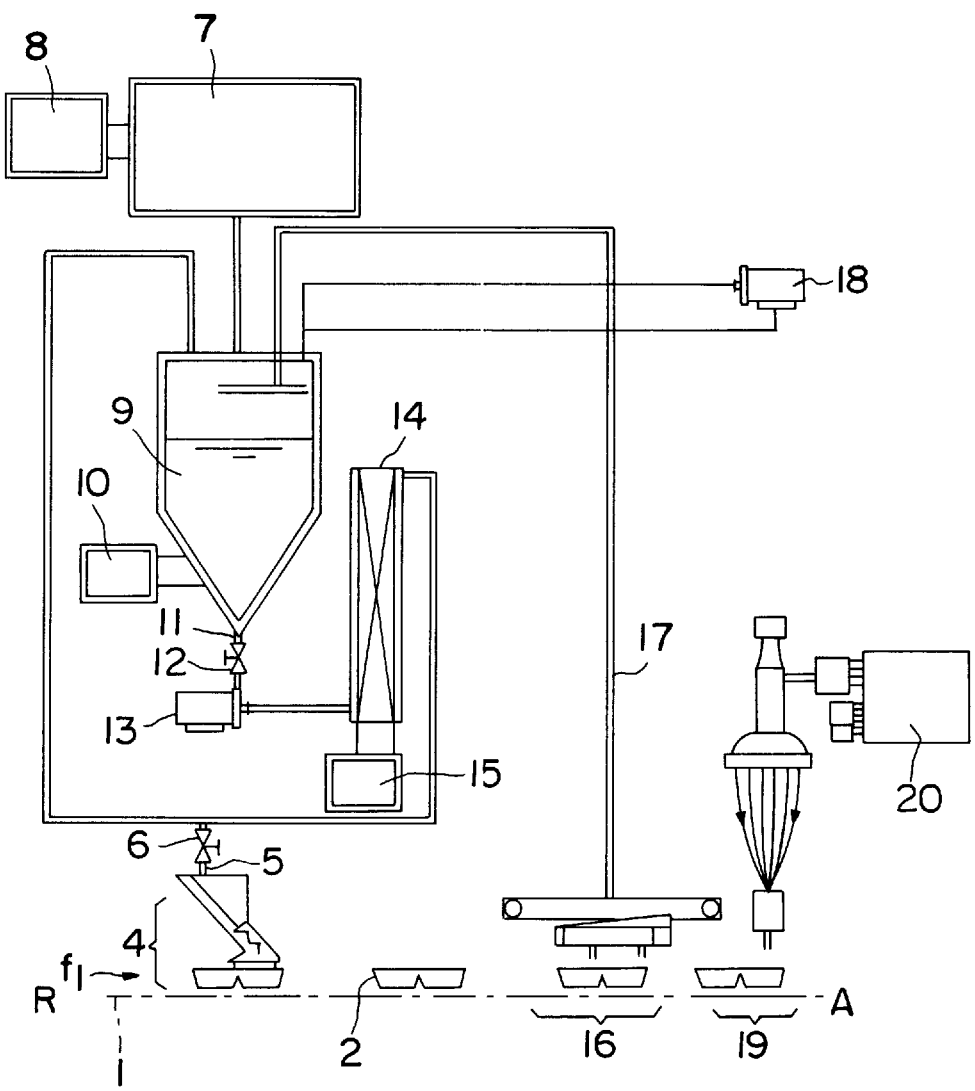

In FIG. 1, the endless conveyor chain 1, driven in a continuous translational movement in the direction of the arrow f1, conveys the mould plates 2 pre-cooled to approximately −30° C. by means of its return length R emerging from the setting tunnel 3 (FIG. 1A). The mould plates are driven by the chain and held in position by eyes on at least their longitudinal edge in engagement with tenons (not shown) fixed to the chain.

The alveoli of the mould plates 2 are filled to the brim by means of a liquid chocolate apportioning machine 4. The chocolate is poured into the feed hopper of the apportioning machine through a pipe 5 provided with a valve 6. The chocolate is fed from the jacketed reservoir 7, thermostatically controlled by means of hot water at approximately 45° C. coming from the reservoir 8, to a jacketed buffer tank 9, also thermostatically controlled with hot water at approximately 45° C. coming from the reservoir 10. From the buffer reservoir 9, the chocolate passes through the pipe 11, provided with the valve 12, and is taken up by the pump 13 and directed to the tubular exchanger 14, thermostatically controlled with hot water at approximately 50° C. coming from the reservoir 15. As a variant, the heat exchanger 14 can be of the plate type.

From the apportioning machine 4, the chocolate is apportioned exactly in the alveoli of the mould plates passing continuously, by means of a volumetric apportioning system with a rotary worm provided with drip-prevention means. In this regard, it is essential for there to be no drips on the surface of the mould plates outside the alveoli, since no provision is made for washing or scraping of the returned empty moulds.

After filling, the mould plates travel on, for approximately 4 to 4.5 seconds, which brings about a hardening of the chocolate on the surface through rapid cooling in contact with the cold mould plates, and are then positioned underneath the chocolate suction device 16. This device will be described in more detail later in the account with reference to FIG. 2. By means of this device, the still-liquid chocolate situated at the centre of the alveoli is sucked out whilst accompanying the mould plates, and the chocolate sucked out is directed by the pipe 17 to the buffer tank 9, through the effect of the vacuum produced in this tank by the vacuum pump 18. Here too, it is essential for the suction of the chocolate to take place without splashing for the reason indicated previously.

The mould plates, in whose alveoli shells with thin walls of chocolate have been formed, are then directed towards the frozen composition apportioning machine 19. This apportioning machine fills these shells with expanded frozen composition, coming from the freezer 20, from apportioning chambers using elevator rams which deliver the exact volume of frozen composition filling an alveolus (not shown). The latter apportioning machine also has drip-prevention means. It is essential for there to be no drips on the surface of the plates outside the alveoli. This is because these drips of ice cream, once hardened, would prevent subsequent removal of the portions from the moulds.

As further illustrated in FIG. 1A, the chain length A then takes the mould plates to a station 21 for depositing wafers 22 of biscuit coated with chocolate, so as to form a barrier against the migration of moisture to the biscuit in contact with the ice cream during storage. The filled mould plates then travel through the setting tunnel 3, maintained at approximately −35° C.

Arriving on the chain length B, at the discharge from the tunnel 3, the mould plates are taken up laterally with respect to the length B, and then turned over by a mechanism (not shown) and the portions are removed from the moulds, preferably by means of hammers, not shown, striking on the back of the plates. The emptied moulds return to the cooling tunnel 3, to be cooled and recirculated on the length R. From the length B, the portions removed from the moulds are taken up and coated with a coating of chocolate in the coating machine 23, and then hardened in the post-cooler 24 and finally wrapped in flow packs in the continuous packing machine 25, and then the packs are placed in boxes, which are stored in a cold chamber.

Figure 2:
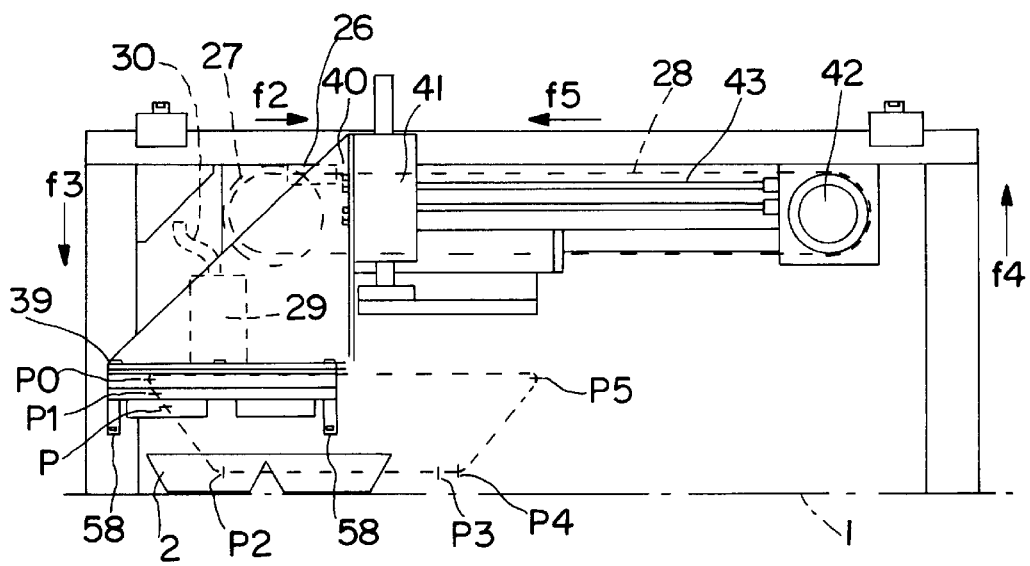
FIG. 2 is a diagrammatic side view of the suction device

In FIG. 2. the suction device comprises a carriage 26, moving in horizontal translation in a reciprocating movement, as explained in more detail below, fixed to the frame of the device. Mounted on the carriage 26 is a direct feed valve 29 which is connected to the suction pipe 17 by a flexible coupling 30. The pipe 17 is connected to the vacuum prevailing in the upper space of the buffer tank 9.

Figure 3:
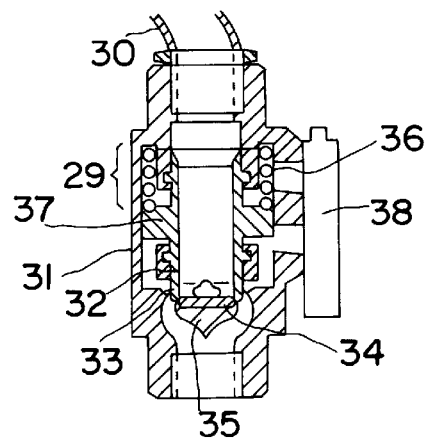
FIGS. 3 to 5 are detailed views, respectively in partial longitudinal section of the suction valve, and in longitudinal section and in partial view from below of the connecting piece of the suction device.

As depicted in FIG. 3, the axial valve 29 consists of a cylindrical body 31 in which there slides a cylindrical sleeve 32, the ring-shaped base 33 of which comes to bear in a sealed manner on the joint 34 of the tulip-shaped seat 35 and thus closes the valve (the position as depicted in FIG. 3) under the pressure of the return spring 36 which acts on the piston 37 fixed to the sleeve 32. A solenoid valve 38 constitutes the automatic pneumatic mechanism which enables the valve to be opened by compressed fluid acting against the spring 36, raising the sleeve 32 into the suction position and thus allowing the liquid chocolate to pass.

The valve 29 is connected to the connecting piece 39. The valve/connecting piece assembly is mounted on a frame 40, itself fixed to the moving part of the elevator 41.

In operation of the suction device, with reference to FIG. 2, when a mould plate offered up under the suction device has been detected by a position detection device, not shown, the carriage 26 is in its extreme rear position.

The path of the point P situated on the connecting piece 39 is indicated on the diagram in dotted lines. The extreme rear point Po corresponds to the start of the cycle. The carriage 26 moves forward in the direction of the arrow f2 under the action of the constant-cycle motor 42, which drives the endless notched belt 28 by means of the pulleys 27, the belt 28 being in engagement with the carriage 26, which for its part slides over the fixed runner 43 by means of rollers, not shown.

The point P, whilst moving forward, at the same time descends in the direction of the arrow f3 under the action of the elevator ram 41. At P1, approximately $\frac{1}{100}$th of a second later, the valve 29 opens, connects the connecting piece 39 to the vacuum and the suction commences. The combined movement continues as far as P2, where the elevator 41 is in the low position. The forward horizontal movement continues then by movement of the carriage in the direction of the arrow f2 as far as the point P3, the suction phase lasting for approximately 1.4 seconds. At P3, the valve 29 closes, which stops the suction.

The horizontal movement continues for approximately $\frac{1}{100}$ second as far as P4. At this moment, the ram progressively raises the elevator 41, and the point P moves in the direction of the arrow f4 for approximately 0.3 seconds whereas the carriage continues its forward movement as far as the extreme forward point P5, and then returns rapidly to its extreme rear position Po in approximately 0.6 seconds in the direction of the arrow f5. The device is then in the position of awaiting a new plate.

Figure 4:
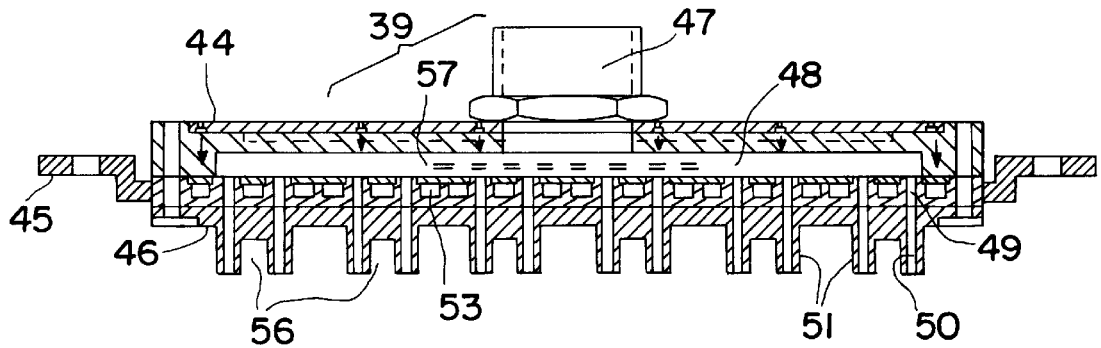
Figure 5:
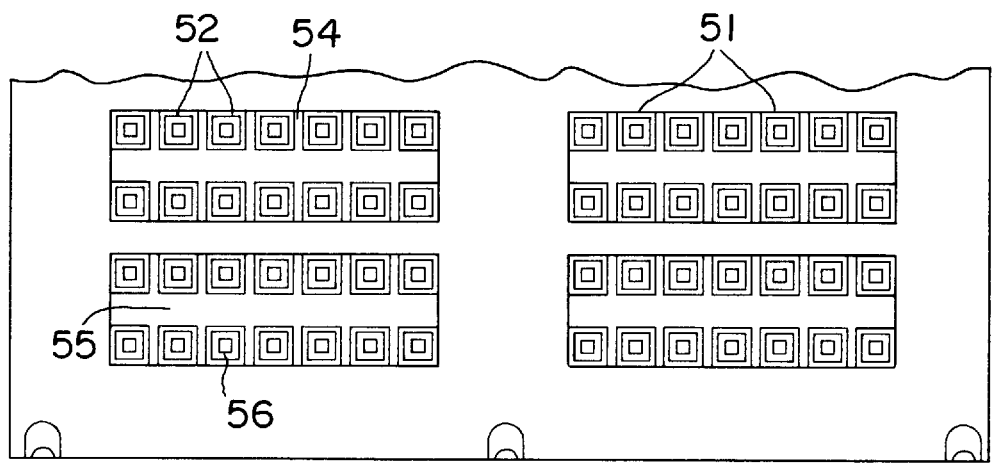

As depicted in FIGS. 4 and 5, the connecting piece 39 is thermostatically controlled and comprises three successive parts 44, 45 and 46 fixed to each other.

The part 44, in the shape of a bell, is connected to the valve 29 by a central orifice 47 opening out into a distribution chamber 48. The intermediate part 45 is a plate with orifices 49 drilled right through at various points distributed through its body and which communicate with the passages 50 formed in the suction sleeves 51 in the form of chambers 52 in the part 46. The intermediate part 45 has a circuit 53 passing through its body, in which a thermostatic control fluid circulates, for example hot water. The circuit 53 prevents the chocolate from setting. The end part 46 comprises rows of sleeves 51, the arrangement of which corresponds to the configuration of the alveoli in the moulds.

In the preferential embodiment depicted, the sleeves 51 are separated from each other by spaces which constitute lateral 54 and longitudinal 55 passages for distributing the liquid flows, so as to avoid the problems of bridging which would be accompanied by suction phenomena. In addition, in order to achieve optimum suction, the sleeves 51 have recesses 56 in the end part of their chambers 52.

According to a preferred variant of the connecting piece 39, this comprises, in the central part of the bell of the part 44, a grid 57 designed to compensate for the preferential flows at the centre compared with the periphery.

With further reference to FIGS. 1 and 2, during the suction phase, the mould plates 2 are maintained in engagement with the endless chain 1 by lugs 58 which prevent them from disengaging from the chain in an upward direction under the effect of the suction.

Figure 6:
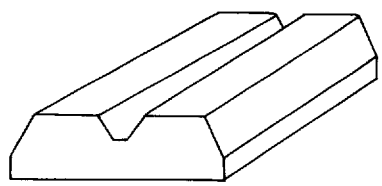
FIGS. 6 and 7 are, respectively, a perspective view and a view in section of a frozen confectionery article.
Figure 7:
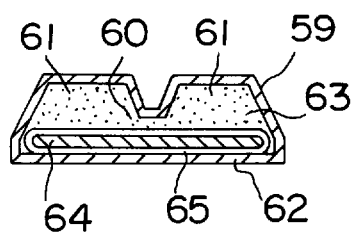

In FIG. 6, the frozen confectionery article has the form of an ingot of a generally trapezoidal section with sharp angles. As observed in FIG. 7, the shell 59 consists of an alveolus 60 composed of two compartments 61 and closed by a base 62. The shell is filled with frozen composition 63, and a wafer 64, surrounded with an enrobing layer 65 of chocolate, is disposed between the frozen composition 63 and the base 62, over practically all the length and all the width of the alveolus.

We claim:

1. A process for preparing a confectionery article comprising, in an atmosphere of less than 60% relative humidity, pouring chocolate having a temperature greater than 35° C. into an aluminum alloy lost-wax-cast-mold having a temperature of not above −10° C. and obtaining in the mold a chocolate shell and a chocolate remainder portion which is contained within the shell and which is sufficiently liquid for being sucked from the shell and vacuum-suctioning the remainder portion from the shell to obtain a confectionery product comprising a shell containing a hollow space.

2. A process according to claim 1 wherein the atmosphere has a humidity of up to 10%.

3. A process according to claim 1 wherein the mold has a temperature of from about −30° C. to about −10° C.

4. A process according to claim 1 or 2 wherein the mold has an interior surface which has a surface-roughness RA value of from 1.6 microns to 3.2 microns.

5. A process according to claim 3 wherein the mold has an interior surface which has a surface-roughness RA value of from 1.6 microns to 3.2 microns.

6. A process according to claim 1 or 2 wherein the remainder portion is retained within the shell prior to vacuum-suctioning for a time so that after vacuum-suctioning, the shell has a thickness of from approximately 0.5 mm to approximately 3 mm.

7. A process according to claim 5 wherein the remainder portion is retained within the shell prior to vacuum-suctioning for a time so that, after vacuum-suctioning, the shell has a thickness of from approximately 0.5 mm to approximately 3 mm.

8. A process according to claim 1 wherein the chocolate poured has a temperature of around 50° C.

9. A process according to claim 1 further comprising depositing a frozen confection into the shell hollow space.

10. A process according to claim 1 wherein the frozen confection is ice cream.

11. A process according to claim 9 or 10 further comprising depositing a biscuit portion which comprises a chocolate coating onto the frozen confection so that the coating is adjacent a surface of the frozen confection.

12. A process according to claim 11 further comprising coating the deposited biscuit with a fatty composition to enrobe the biscuit.

13. A process according to claim 1 wherein the chocolate comprises fat and the fat is in an amount of less than 50% by weight.

14. A process according to claim 1 wherein the mold has a temperature of from −25° C. to −10° C. and an interior surface-roughness RA value of from 1.6 microns to 3.2 microns and the shell obtained has a thickness of from approximately 0.5 mm to approximately 3 mm.

15. A process according to claim 14 further comprising depositing a frozen confection into the shell hollow space.

16. A process according to claim 15 wherein the frozen confection is ice cream.

* * * * *